United States Patent [19]
Kreis et al.

[11] 3,916,872
[45] Nov. 4, 1975

[54] HEAT STORAGE DISH

[75] Inventors: Egon Kreis; Niklaus Kehl, both of St. Gall, Switzerland

[73] Assignee: Kreis AG, St. Gall, Switzerland

[22] Filed: Apr. 5, 1974

[21] Appl. No.: 458,348

[52] U.S. Cl. ............... 126/375; 126/246; 219/385; 219/530
[51] Int. Cl.² .......................................... F24H 7/00
[58] Field of Search ............ 126/375, 246; 220/17; 206/501; 219/385, 386, 521, 530, 10.49

[56] References Cited
UNITED STATES PATENTS

| | | | |
|---|---|---|---|
| 1,940,172 | 12/1933 | Hybinette | 126/246 |
| 3,126,882 | 3/1964 | Hilfiker | 126/246 |
| 3,148,676 | 9/1964 | Truog et al. | 126/375 |
| 3,557,774 | 1/1971 | Kreis | 126/375 |
| 3,734,077 | 5/1973 | Murdough et al. | 126/375 |
| 3,745,290 | 7/1973 | Harnden | 219/10.49 |

FOREIGN PATENTS OR APPLICATIONS 1,581,110   9/1969   France ............................. 219/385

*Primary Examiner*—Carroll B. Dority, Jr.
*Assistant Examiner*—Larry I. Schwartz
*Attorney, Agent, or Firm*—Werner W. Kleeman

[57] ABSTRACT

A heat storage dish comprising a central heat storage plate and an insulation member surrounding said heat storage plate. Means effective during stacking of a plurality of such heat storage dishes serve to ensure that there is established a good heat transfer relationship between the heat storage plates of adjacently stacked heat storage dishes.

11 Claims, 4 Drawing Figures

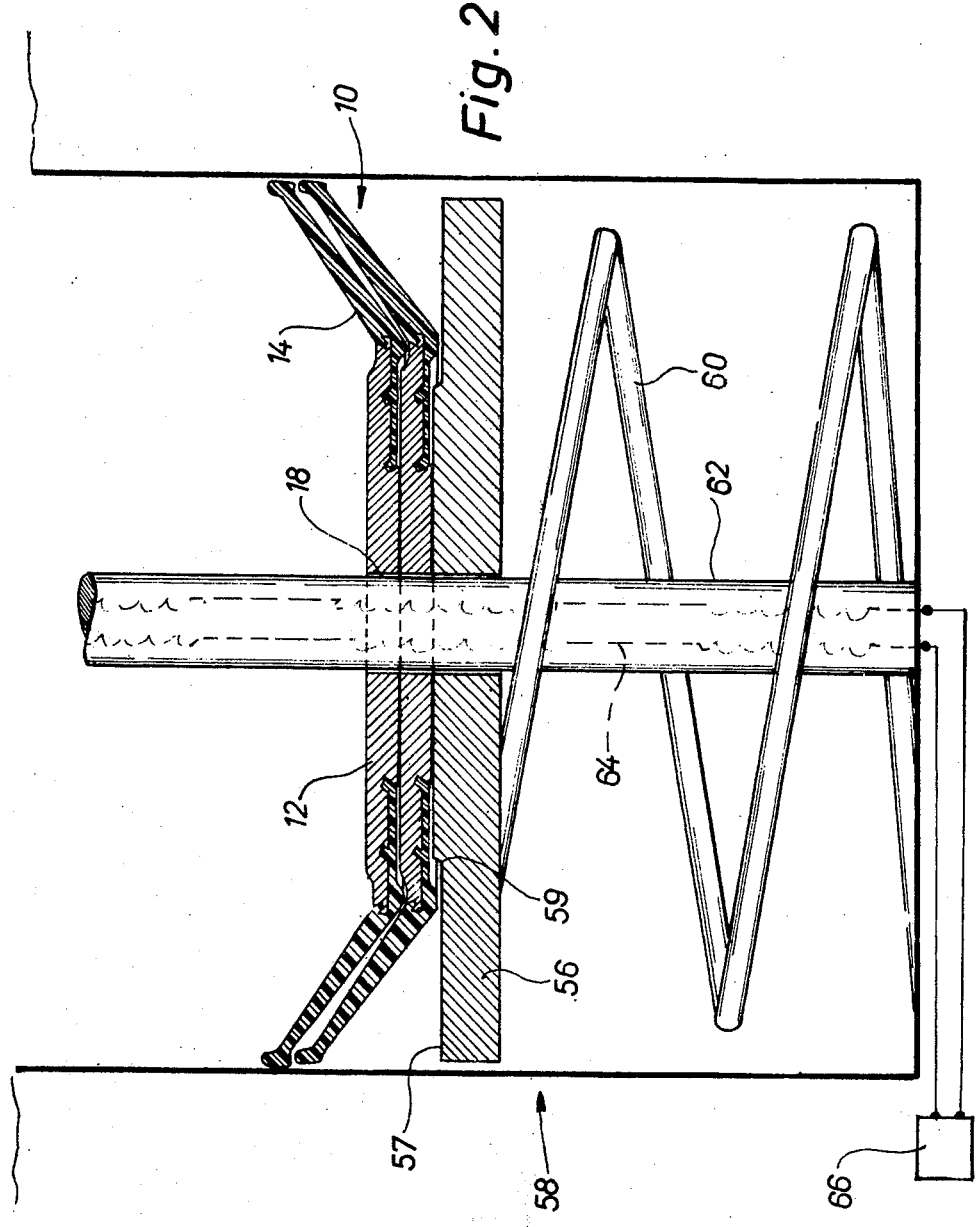

HEAT STORAGE DISH

BACKGROUND OF THE INVENTION

The present invention relates to a new and improved construction of heat storage dish, especially suitable for keeping hot food serving ware such as a plate on which food is placed, or even used itself as a server for keeping hot food received directly therein.

Different constructions of heat storage dishes are known in the art. The use thereof has become increasingly more widespread, particularly where it is necessary to maintain food or the like hot until the same can be consumed. A particularly advantageous environment of use of such heat storage dishes is in establishments where the food dispensing and/or preparing area is at a considerable distance from the consumer, such as in hospitals where the kitchen is located a relatively long distance from the patients. Even if the food is dispensed from food serving carts or the like there is still a need to keep the food warm until it reaches the area or rooms of the individual patients for which it is intended. Hence, in this environment, by way of example, heat storage dishes have found increasing use. But of course the advantages of such heat storage dishes is not confined strictly to hospitals, since other situations can be envisioned where the same results are desired, such as nursing homes, sanitoriums, hotels, particularly for room service, and generally whenever it is desired to keep the food hot until it is consumed.

One prior art proposal for avoiding undesirable cooling of the food prior to its consumption contemplates reducing the transfer of heat through the use of thermal insulation which, however, generally requires a considerable amount of space, and necessitates removal of the food from an insulated container and the removal of the insulation prior to serving, constituting a considerable amount of work and expenditure.

Another proposal which has been advanced is to serve the food disposed upon a heat storage dish filled, for instance, with water, this medium either being heated prior to serving the food or is introduced into the heat storage dish in a heated condition. But this technique requires special heating and filling devices, and a certain amount of dexterity in using the heat storage dish to avoid being scalded by the hot water.

Furthermore, in commonly assigned U.S. Pat. No. 3,557,774 there is disclosed a heat storage dish having a heat storage plate enclosed between an interior wall and an exterior wall secured together at their marginal edges so as to prevent the entry of any external media, such as washing liquid, into the confines of the hollow space between such walls. The heat storage plate together with the heat storage plate contained in the hollow space or cavity thereof can be conveniently heated, so that the heat storage dish is maintained in a heated state in order to keep the food placed therein equally hot. Provision is also made to safeguard against bursting apart of the heat storage dish owing to possible excessive heating and increased internal pressure. While this prior art construction of heat storage dish already affords notable advantages in the art, performs its intended function extremely well and has found great acceptance in the marketplace, still, relatively speaking, it is rather complicated and expensive in construction, requiring the use of a larger number of components to form the finished fabricated heat storage dish.

A further prior art construction of heat storage dish is disclosed in the commonly assigned Swiss Pat. No. 445,044 and comprises a heat storage disc or plate surrounded by an insulating edge which serves to support the heat storage disc. This heat storage disc is provided with a central opening through which there can be introduced a heating rod for heating purposes. While this construction of heat storage dish already provides considerable advantages with regard to the relative simplicity of its construction and design, it has nonetheless been found that satisfactory heating up of such heat storage dishes, particularly in stacked condition, is not always easy to accomplish. The heat storage disc or plate is supported in a considerably inwardly withdrawn position within the confines of the insulating edge, so that when a number of such heat storage dishes are stacked the heat storage disc of one stacked heat storage dish is spaced at such a distance from the surface of the heat storage disc of the next adjacent stacked heat storage plate that a really good heat transfer relationship is not established, and in any case there is not present any heat conducting contact between adjacent heat storage discs of the stack since the insulating edges of the stacked heat storage dishes only bear against one another there is little, if any, heat transfer from one of the stacked heat storage dishes to the other. As a result, it is increasingly more difficult to heat up all of the heat storage dishes of the stack and a greater heating time is required to accomplish heating thereof.

SUMMARY OF THE INVENTION

Hence, it will be apparent from what has been discussed above that this particular field of technology is still in need of a heat storage dish which is not associated with the aforementioned drawbacks and limitations of the prior art constructions. Therefore, it is a primary object of the present invention to provide an improved construction of heat storage dish which effectively and reliably fulfills the need still existing in the art.

Another and more specific object of the present invention aims at the provision of a new and improved construction of heat storage dish which is relatively simple in construction and design, economical to manufacture, easy to clean and use, and provides for relatively simple and efficient heating thereof.

Yet a further significant object of the present invention aims at the provision of a new and improved construction of heat storage dish equipped with means promoting the transfer of heat between adjacently situated heat storage dishes of a stack thereof.

An additional object of the invention aims at a simplified construction of heat storage dish composed of only essentially two components, namely a central heat storage plate and an insulation member surrounding the heat storage plate, and means for promoting transfer of heat from one heat storage plate to the next adjacently situated heat storage plate of a stack of such heat storage dishes.

Now in order to implement these and still further objects of the invention, which will become more readily apparent as the description proceeds, the invention contemplates the provision of a heat storage dish comprising a central heat storage plate, means defining an insulation member surroundng the heat storage plate, and means effective during stacking of a plurality of the heat storage dishes to ensure that a good heat transfer relationship is established between the heat storage plates of adjacently stacked heat storage dishes. In this way, heating of the stack of heat storage dishes is beneficially promoted since a certain amount of heat will be transferred from one heat storage plate to the next situated heat storage plate of a stack of such heat storage dishes.

According to a specific preferred constructional manifestation of the invention the means effective during stacking of the heat storage dishes for promoting heat transfer between adjacent heat storage plates thereof contemplates the provision of a depression, preferably in the form of a groove, at each heat storage dish. This depression possesses a depth sufficient to permit at least a portion of the under surface of the next overlying adjacent heat storage dish to be received therein to such an extent that the lower surface of the heat storage plate of the overlying heat storage dish comes to lie at least in close proximity to the confronting upper surface of the heat storage plate of the next lower situated heat storage dish, so that a good cooperative heat transfer relationship is established between such surfaces.

According to a particularly preferred constructional embodiment the depth of the groove is such that these confronting surfaces of each two adjacently arranged stacked heat storage dishes come into actual physical heat conducting contact with one another, thereby effectively promoting the transfer of heat by conduction from one heat storage plate to the next adjacent heat storage plate and so on.

A further feature of the invention contemplates extending at least a portion of the heat storage plate downwardly in the direction of a plane extending through the supporting portions or surfaces of the heat storage dish, yet terminating at a slight spacing from such plane. Due to these measures the depth of the depression, i.e., groove can be made smaller and there is still positively ensured that when the heat storage dish is placed upon a supporting surface, such as a table or tray, the heated heat storage plate will not come into contact with such surface, so as to protect the same against undesired burning or scorching.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a schematic cross-sectional view of a plurality of stacked heat storage dishes of the type depicted in FIG. 1 arranged in a dispenser which simultaneously serves to heat such heat storage dishes;

DETAILED DESCRIPTION OF THE PREFERRED EMBODIMENTS

Figure 1:
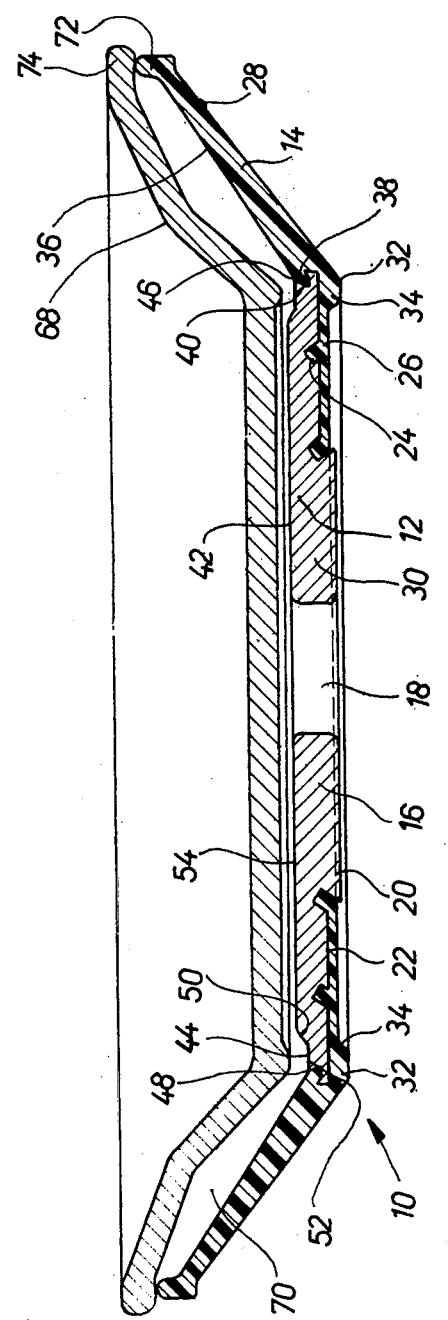
FIG. 1 is a cross-sectional view of a first embodiment of heat storage dish designed according to the invention and also showing a serving plate or the like in which the food is retained and received within the confines of such heat storage dish.

Describing now the drawings, the exemplary embodiment of heat storage dish depicted in FIG. 1 will be understood to be generally designated in its entirety by reference character 10. Heat storage dish 10 is essentially composed of a central heat storage plate or disc 12 and an insulation or insulating member 14 which surrounds such heat storage plate 12. The heat storage plate 12 can, by way of example, possess a circular configuration, in which case the surrounding bowl-like insulation member 14 would likewise have for instance a circular, typically ring-shaped configuration, but it is to be expressly understood that different shapes of the heat storage dish 10 are equally contemplated without in any way departing from the teachings of the invention. For instance, heat storage dish 10 can be of quadratic shape, such as square or rectangular, in which case the heat storage plate 12 would possess such configuration and the enclosing insulating member 14 a corresponding configuration.

Regardless of the particular shape of the heat storage dish 10, the heat storage plate or disc 12 is formed of a heat conducting material, typically a suitable metal, such as aluminum or an aluminum alloy which advantageously can be chrome plated at its surface in order to improve its scratch resistance. The insulation member 14 is formed of a suitable material of sufficiently low thermal conductivity, typically plastic, and preferably a fiber reinforced plastic, and fiber-reinforced nylon has been found to be a particularly suitable plastic material owing to its heat and impact resistance. Of course, other materials having appropriately low thermal conductivity can be employed, for instance ceramic materials, as can other plastics, such as for instance polypropylene, polycarbonate, for instance available under the registered mark "MAKROLON" of the well known German firm Bayer Leverkusen, the plastic available on the market under the mark "POLYSULSONE" of Union Carbide Corporation, which is a condensation polymer of bisphenol A and dehydroxyl diphenylsulfone, and the commercially available plastic, sold under the mark "NOREL" of Polychemie AG, of Anheim, Germany, just to mention a few other possible plastic materials.

The heat insulation or insulating member 14 is preferably molded, typically by injection molding according to conventional procedures, about the central heat storage plate 12 in order to form the bipartite heat storage dish 10. In the embodiment depicted in FIG. 1 and assuming for instance by way of illustration and not limitation that the central heat storage plate 12 possesses a substantially circular configuration, it is to be understood that such heat storage plate 12 is composed of a substantially circular metallic body member 16 which may be equipped with a central opening 18 for purposes to be described more fully hereinafter. Of course, the central opening 18 can be omitted, as is the case for the embodiment shown in FIG. 3. This body member 16 may be provided at its lower surface 20 with an inwardly stepped or recessed annular portion 22 equipped with the slanted grooves or recesses 24 appropriately machined or otherwise worked thereat. These grooves 24 may be in the form of continuous grooves extending about the annular portion 22 and constitute means for receiving the material, here the plastic, from which the insulation member 14 is formed during injection molding, so as to provide a secure attachment between the insulation member 14 and the heat storage dish 12. Thus, during the injection molding operation the plastic material flows into these slanted grooves 14, which are sloped in the manner shown towards the axial center line of the heat storage dish 10, in order to provide a firm connection between the insulation member 14 and the heat storage plate 12.

Further, the substantially bowl-shaped insulation member 14 incorporates a horizontally extending portion 26 of insulation material, here in the form of an annular or ring-shaped portion, which underlies part of the lower surface 20 of the heat storage plate 12, thereby providing a safety feature in terms of preventing or minimizing the likelihood of contact of the hand of the user with the central heat storage plate 12 when the latter is in a heated condition. Thus, should the user carelessly grip the insulation member 14 with his fingers extending beneath the downwardly sloping outer wall 28 thereof, then contact only will be made with the heat insulating plastic material ring 26, thereby preventing burning of the user's fingers. Moreover, owing to the recessed configuration of the heat storage plate 12 at its underside there is formed a central protruding portion 30 which extends downwardly to a greater extent than the ring-shaped portion or surface 22 and advantageously terminates inwardly of a horizontal plane extending through the lowermost annular supporting surface 32 defined by the extreme lower radially inwardly directed portions 34 of the downwardly sloping outer wall 28 of the insulation member 14. The supporting surface 32 defined by the transition location between the outer wall 28 of the insulation member 14 and the horizontal ring-shaped portion 26 is constituted by an annular protruding ledge-like supporting member or portion by means of which the heat storage dish 10 bears when placed upon a surface, such as a table or tray, which has not been particularly shown. Due to the fact that the downwardly depending central portion 30 of the heat storage plate 12 does not extend right up to the horizontal plane passing through the supporting surface or portion 32 of the heat storage dish 10 there is no danger of scorching or otherwise damaging such table or tray by the heat of the heat storage plate 12, since there is no physical contact between the heat storage plate 12 and the surface of the table, tray or the like. Typically, and purely by way of example, the lower surface of the central downwardly protruding portion 30 is spaced from the plane containing the supporting surface 34 of the heat storage dish 10 by about 2 to 4 millimeters.

The inward recessing or placement of the central portion 30 also provides to a certain extent a safety feature in that no portion of the heated storage plate 12 protrudes from the underside of the insulation member 14, thereby minimizing the danger of accidents and injury to the user.

The heat insulation member 14, assuming that the central heat storage plate 12 is of circular configuration, may possess a substantially frusto-conical cross-sectional configuration, as best seen by referring to FIG. 1. Of course, as mentioned above different shapes are possible, depending upon the desired configuration of the heat storage dish. Apart from the downwardly sloping outer wall 28 the heat insulation member 14 also has a downwardly sloping inner wall 36, the lower portion or end 38 of which is firmly secured, during the injection molding process, to the outer circumference or periphery 40 of the heat storage plate 12. The upper surface 42 of the heat storage plate 12 is provided at its peripheral region 40 with a stepped or recessed portion 44 defining a depression 46, preferably in the form of a continuous groove 48. Groove 48 comprises a downwardly sloping portion 50 and a horizontally extending portion 52 provided at the upper surface 42 of heat storage plate 12. The lower portion or end 38 of the inner wall 36 of the heat insulation member 14 merges with the outer extremity of the horizontally extending portion 52 of the groove-like depression 46 so as to complete the formation of a trough-like continuous groove of substantially V-shaped cross-section, for instance. Further, it will be noted that portion 54 of the upper surface 42 of the heat storage plate 12 surrounded by the slanting wall portion 50 of the groove 48 is located above the lower portion or end 38 of the inner wall 36 of the heat insulation member 48.

The depression 46 forming the groove 48 constitutes means effective during stacking of a plurality of such heat storage dishes 10 to ensure for good heat transfer between the heat storage plates 12 of adjacently stacked heat storage dishes. Considering this aspect in greater detail, reference is now made to FIG. 2 wherein two such heat storage dishes 10 are arranged in stacked relationship upon a spring-loaded supporting and dispensing plate 56 of a suitable dispenser unit for such heat storage dishes, and which dispenser unit has generally been designated by reference character 58. This dispenser or dispenser unit 58 may be of conventional design and possesses biasing means, typically a spring, such as helical spring 60 which acts against the underside of the supporting and dispensing plate 56 so that, as each heat storage dish 10 is removed from the dispenser 58, a new heat storage dish is placed into the position previously occupied by the removed heat storage dish. The upper surface 57 of the plate 56 advantageously has a stepped portion 59 to permit the downwardly protruding portion 30 of the lowermost heat storage dish 10 to securely bear against such plate 56, as shown.

Dispenser 58 further incorporates a centrally arranged heating element in the form of a heating rod or bar 62 through which extends for instance an electrical resistance heating wire or coil 64 connected with a suitable voltage source 66. As should be readily apparent heating of the electrical resistance coil or wire 64 causes the heating bar or rod 62 to heat-up and heat to be appropriately transferred, as by conduction, convection and/or radiation, to the heat storage plates 12 of the stacked heat storage dishes 10 supported upon the dispensing plate 56, the heating rod 62 piercingly extending through the central openings or apertures 18 of the stacked heat storage dishes 10 in the manner shown in FIG. 2 and also promoting the stacking thereof. The heat insulating members 14 of the stacked dishes and located furthest from the heating rod 62 are not appreciably heated.

When the heat storage dishes 10 are placed in overlying stacked relationship in the dispenser 58 then the supporting surface 32 of a heat storage dish 10 which is located above the next adjacent lower situated heat storage dish enters the depression 46 of such lower situated heat storage dish so that there is established a good heat transfer relationship between the heat storage plates 12 of adjacently situated heat storage dishes. According to a preferred exemplary embodiment, the depression 46 possesses such a depth that the upper situated heat storage dish can have its supporting surface 32 sufficiently received with play in such depression and without contacting the floor of the depression, so as to ensure that good heat conducting contact is established between the lower protruding surface 30 of one heat storage dish and the confronting adjacent upper surface 42 of the heat storage plate 12 of the next lower situated heat storage dish, as best seen by referring to FIG. 2. By way of example, the depth of the groove-like depression 46 normally may amount to 3 to 4 millimeters, although this depth also would be governed by the spacing of the lower protruding surface 30 of the heat storage plate from the plane containing the supporting surface 32. If this spacing is made greater, then the groove depth must be chosen to be correspondingly greater so as to provide the aforementioned good heat conducting contact between the confronting lower and upper surfaces of the heat storage plates 12 of neighboring stacked heat storage dishes 10. Owing to the good heat conducting contact which is established between the heat storage plates 12 of adjacently stacked heat storage dishes 10 there is guaranteed that during the heating operation each of the heat storage plates of the stacked heat storage dishes will be properly heated up to the desired temperature needed to maintain the food in a hot condition for serving.

Under certain circumstances, it may be sufficient to have the depth of the depression 46 selected such that the supporting surface 32 of a neighboring stacked dish bears against the floor of such depression, and thus slightly raises the downwardly protruding surface 30 of the overlying stacked heat storage dish so that it is not in actual heat conducting contact with the upper surface 42 of the next lower adjacent situated heat storage dish, yet still is in sufficient close proximity to such upper surface 42 of the heat storage plate 12 that a good heat transfer relationship is nonetheless established between the heat storage plates of the neighboring stacked heat storage dishes. While such modification is possible, it is preferred however if actual physical contact is present between these confronting surfaces so as to provide for heat conducting contact between the confronting lower and upper surfaces of the heat storage plates 12 of neighboring stacked heat storage dishes 10 as discussed above.

Now with the embodiment of heat storage dish 10 as shown in FIG. 1 by way of example, wherein there is provided a central opening or aperture 18 at the heat storage plate 12 for the purpose of piercingly receiving the heating element 62 for heating each such heat storage plate 12, the food to be kept hot is preferably placed into a serving plate 68 which is received within the confines or compartment 70 of the heat storage dish 10, as best seen by referring to FIG. 1. The insulation member 14 is provided at its upper end with a protruding ledge portion 72 against which there can bear the marginal edge 74 of the food serving plate 68 in the manner shown. The serving plate 68, when supported by the heat storage dish 10, receives the heat therefrom so as to maintain hot the food contained in such plate. This plate 68 can be supported in slightly spaced overlying relationship with respect to the upper surface 42 of the heat storage plate 12 or, if desired, can in fact be supported so as to rest upon such upper surface. If the central opening or aperture 18 of the heat storage plate 12 is omitted, as is the case for the embodiment of FIG. 3 which in all other respects is constructed the same as the embodiment of FIG. 1, then it would even be conceivable to use the heat storage dish 10 as the actual food receiving plate, although there is usually employed in conjunction with such heat storage dish a separate food serving plate which is placed therein.

Figures 3, 4:
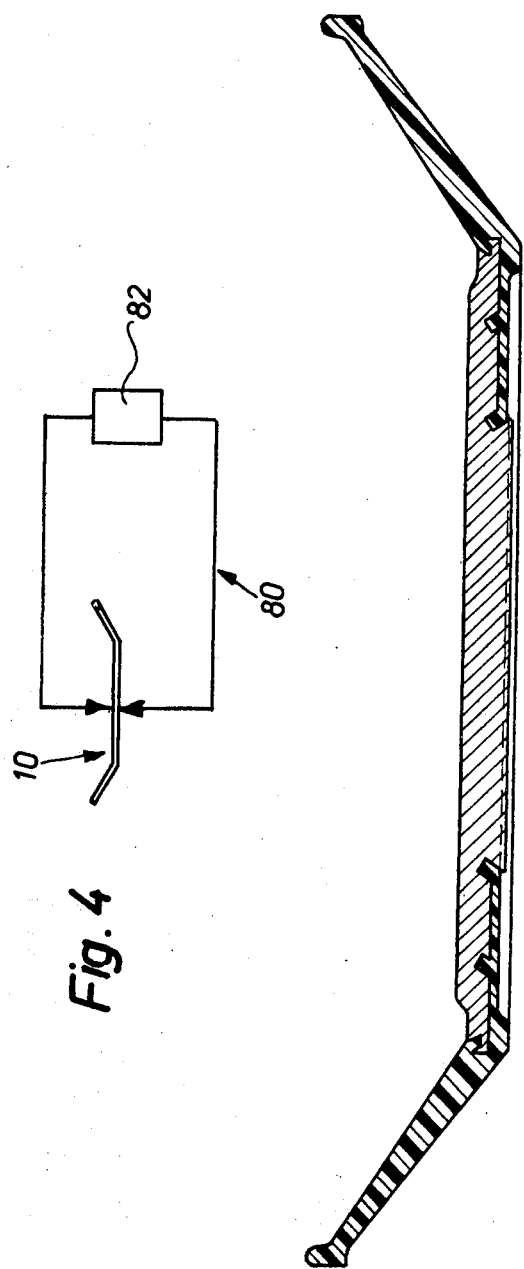
FIG. 3 is a cross-sectional view, similar to the showing of FIG. 1, of a modified embodiment of heat storage dish.
FIG. 4 schematically illustrates a plurality of heat storage dishes, which may be of the type shown in FIGS. 1 or 3, and heated by an inductive heating device, e.g. a high-frequency field.

With the modified version of heat storage dish 10 as shown in FIG. 3 the same can be suitably heated, for instance by subjecting such to the action of a high-frequency field. Thus, in FIG. 4 there is shown a conventional heating circuit 80 employing a high-frequency generator 82 for inductively heating one or a number of heat storage dishes, which may be either of the type shown in FIG. 3 or the type shown in FIG. 1, by means of a high-frequency field.

In all of the embodiments herein disclosed each groovelike depression, apart from the significant function of establishing the required heat transfer relationship between the heat storage plates and preferably a heat conducting contact between such heat storage plates of adjacently stacked heat storage dishes, further provides the advantage that during stacking of a plurality of such heat storage dishes such groove-like depressions facilitate the stacking of such heat storage dishes as well as tending to promote the centering and retention of the stack of such heat storage dishes. Also, it should be apparent that owing to the bipartite construction of each heat storage dish, namely the central heat storage plate surrounded by the heat insulation member, there is provided a heat storage dish which is of relatively simple construction and design, also one which is economical to manufacture, and furthermore easy to clean and use as well as to heat-up. Additionally, it is relatively lightweight in structure and not readily subject to damage owing to the good impact resistance of the material from which the heat storage dish is formed. Equally the danger of accidental injury to the user is minimized since the heat insulation material not only surrounds the central heat storage plate but a portion thereof extends beneath the underside of such heat storage plate, thereby providing a safety feature against unintentional injury to the user. There are preferably no protruding heated parts which extend from the underside of the heat storage dish, again providing an increased degree of safety in the use of the heat storage dish when heated. Moreover, the cooperative dimensioning of the protruding portions of the underside of the heat storage dishes and the depth of the groove-like depressions thereof ensures for the beneficial heat transfer, and specifically in the preferred embodiment the extremely desirable heat conducting contact, between the heat storage plates of adjacently stacked heat storage dishes, thereby ensuring that each heat storage dish will be properly heated prior to use.

While there is shown and described present preferred embodiments of the invention, it is to be distinctly understood that the invention is not limited thereto, but may be otherwise variously embodied and practiced within the scope of the following claims.

Accordingly, what is claimed is:

1. A heat storage dish comprising a central heat storage plate, means defining an insulation member surrounding said heat storage plate, means effective during stacking of a plurality of said heat storage dishes for establishing heat transfer relationship between the heat storage plates of adjacently stacked heat storage dishes, said effective means essentially provides heat conducting contact between the heat storage plates of adjacently stacked heat storage dishes, said insulation member including downwardly sloping inner wall means extending towards the heat storage plate surrounded by said insulation member, said heat storage plate possessing an upper surface at least part of which protrudes upwardly away from the lowermost location of said downwardly sloping inner wall means, said heat storage plate further including a lower surface extending downwardly past said lowermost location of said downwardly sloping inner wall means.

2. The heat storage dish as defined in claim 1, wherein each heat storage plate comprises an upper surface and a lower surface, said effective means comprises depression means for receiving at least part of said insulation member of an overlying adjacent stacked heat storage dish, so that at least a portion of the lower surface of the heat storage plate of said overlying adjacent stacked heat storage dish comes into heat conducting contact with at least a portion of the upper surface of the heat storage plate of the lower situated heat storage dish.

3. The heat storage dish as defined in claim 2, wherein said depression means comprises a continuous groove of sufficient depth to permit reception of at least part of the under surface of said overlying adjacent stacked heat storage dish.

4. The heat storage dish as defined in claim 3, wherein said continuous groove is located at an outer circumferential surface of the heat storage plate and an adjacent neighboring portion of said insulation member.

5. The heat storage dish as defined in claim 1, wherein said insulation member further includes a downwardly sloping outer wall means including a supporting portion, said heat storage plate including a downwardly protruding portion defining at least a portion of the lower surface of said heat storage plate, said downwardly protruding portion extending in close proximity to a plane intersecting said supporting portion of the downwardly sloping outer wall means of the insulation member.

6. The heat storage dish as defined in claim 5, wherein the downwardly protruding portion is spaced from said plane in the order of about 2 to 4 millimeters.

7. The heat storage dish as defined in claim 1, wherein said insulation member includes a portion engaging beneath a part of the under surface of the heat storage plate to protect the user against contact with the marginal region of said heat storage plate.

8. The heat storage dish as defined in claim 1, wherein said heat storage plate is provided with an opening capable of receiving a heating element for heating the heat storage plate thereof.

9. The heat storage dish as defined in claim 8, wherein said heat storage plate can be inductively heated.

10. The heat storage dish as defined in claim 1, wherein said heat storage plate is a solid body member.

11. The heat storage dish as defined in claim 10, wherein said solid body member can be inductively heated.

* * * * *